Oct. 4, 1938.  E. J. VON HENKE  2,132,196
TRANSFORMER
Filed Sept. 3, 1936   5 Sheets-Sheet 1

INVENTOR.
Edmund J. von Henke
BY
ATTORNEYS.

Oct. 4, 1938.  E. J. VON HENKE  2,132,196

TRANSFORMER

Filed Sept. 3, 1936  5 Sheets-Sheet 2

INVENTOR.
Edmund J. von Henke
BY
ATTORNEYS.

Oct. 4, 1938.  E. J. VON HENKE  2,132,196
TRANSFORMER
Filed Sept. 3, 1936     5 Sheets-Sheet 4

INVENTOR
Edmund J. von Henke
BY
Gifford, Scull & Burgess
ATTORNEYS.

Oct. 4, 1938.  E. J. VON HENKE  2,132,196
TRANSFORMER
Filed Sept. 3, 1936  5 Sheets-Sheet 5
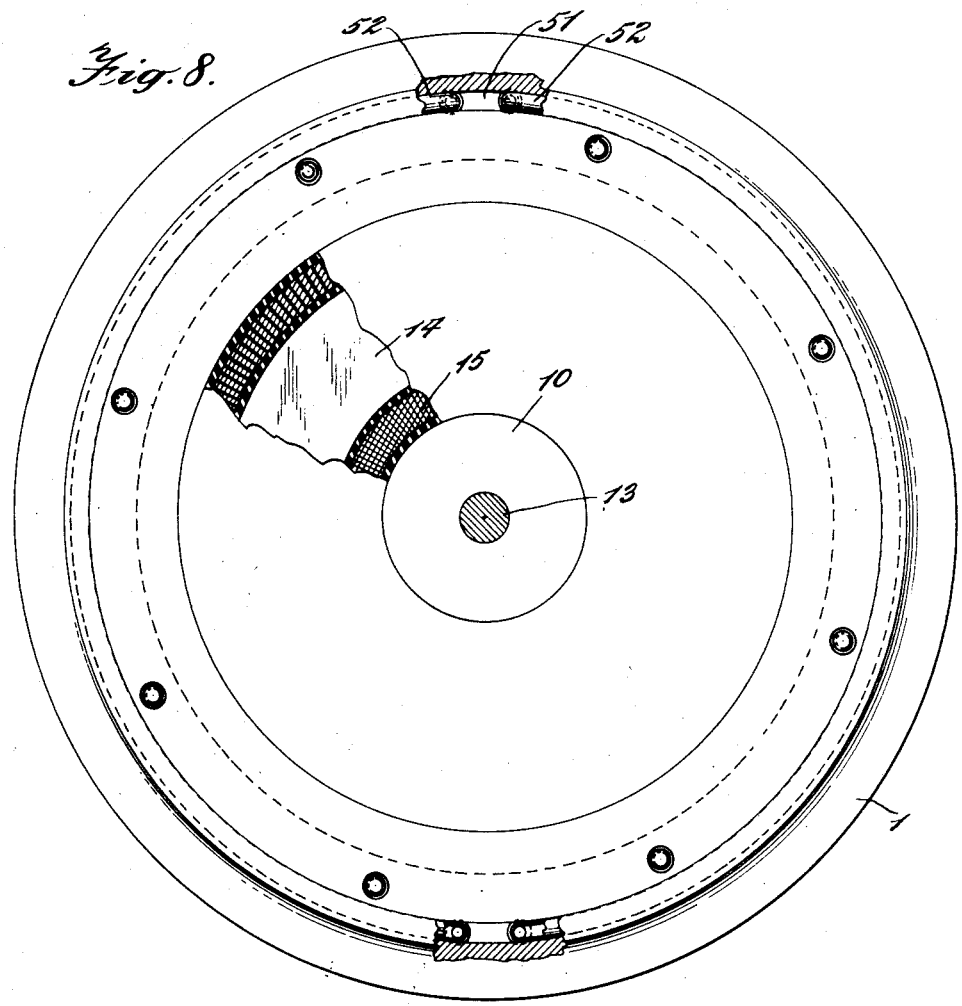
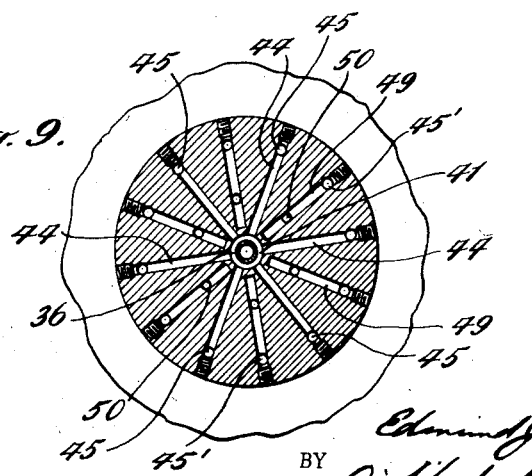

Patented Oct. 4, 1938

2,132,196

UNITED STATES PATENT OFFICE 2,132,196

TRANSFORMER

Edmund J. von Henke, Chicago, Ill., assignor to American Electric Fusion Corporation, Chicago, Ill., a corporation of Illinois Application September 3, 1936, Serial No. 99,218

6 Claims. (Cl. 219—6)

This invention relates to a novel and improved transformer, more particularly a transformer adapted to be used for welding, and the novel features will be best understood from the following description and the annexed drawings, in which I have shown a selected embodiment of the invention and in which:

Fig. 8 is a view taken approximately on the line 8—8 of Fig. 6;

Fig. 9 is a view taken approximately on the line 9—9 of Fig. 6;

The transformer disclosed herein is one which may be used for welding tubing in a manner somewhat similar to that illustrated in my prior Patent No. 1,862,642, granted June 14, 1932, and is believed to be an improvement on the transformer shown in that patent.

Figure 1:
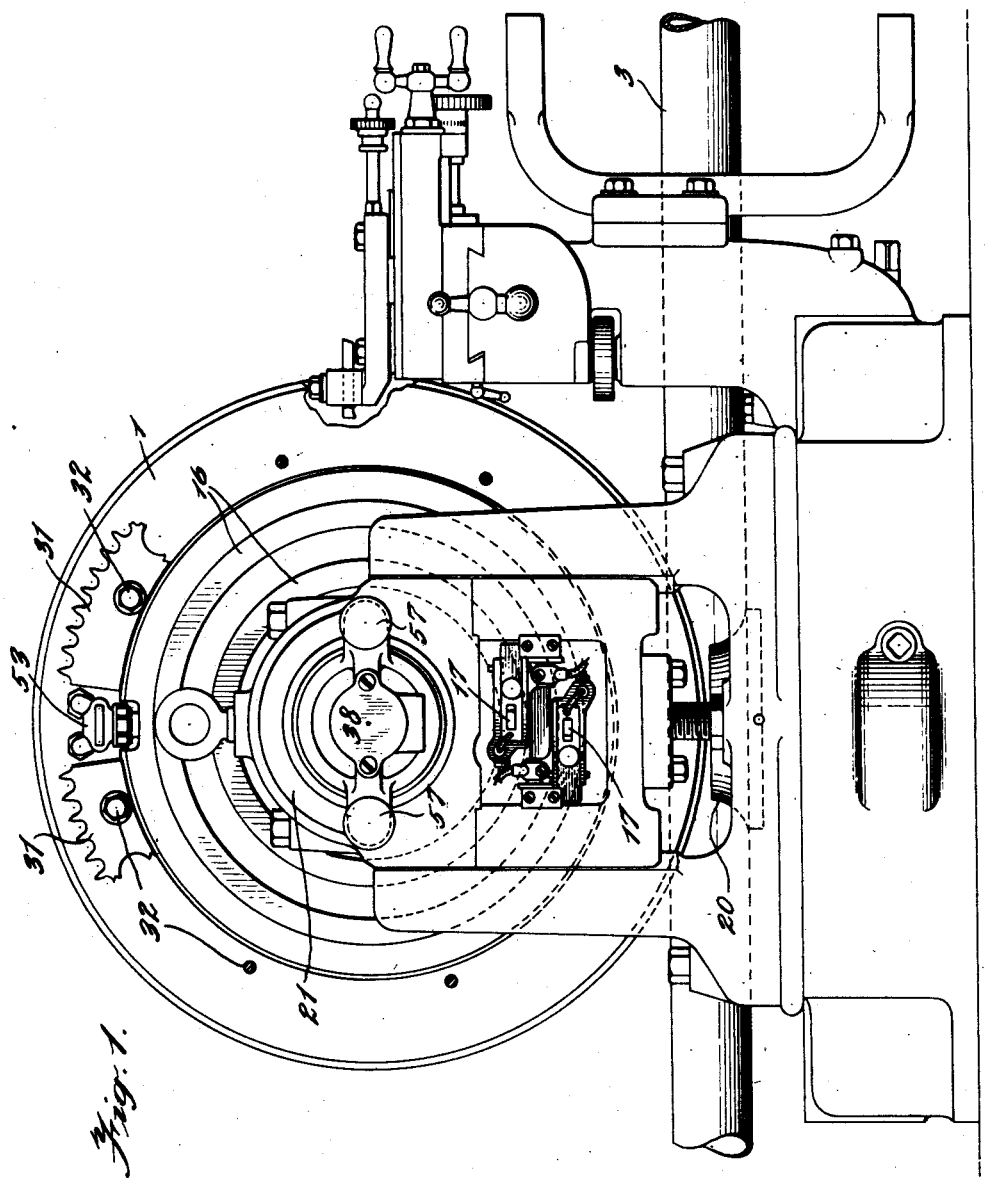
Fig. 1 is a vertical side elevation of a transformer constructed according to the invention.
Figure 2:
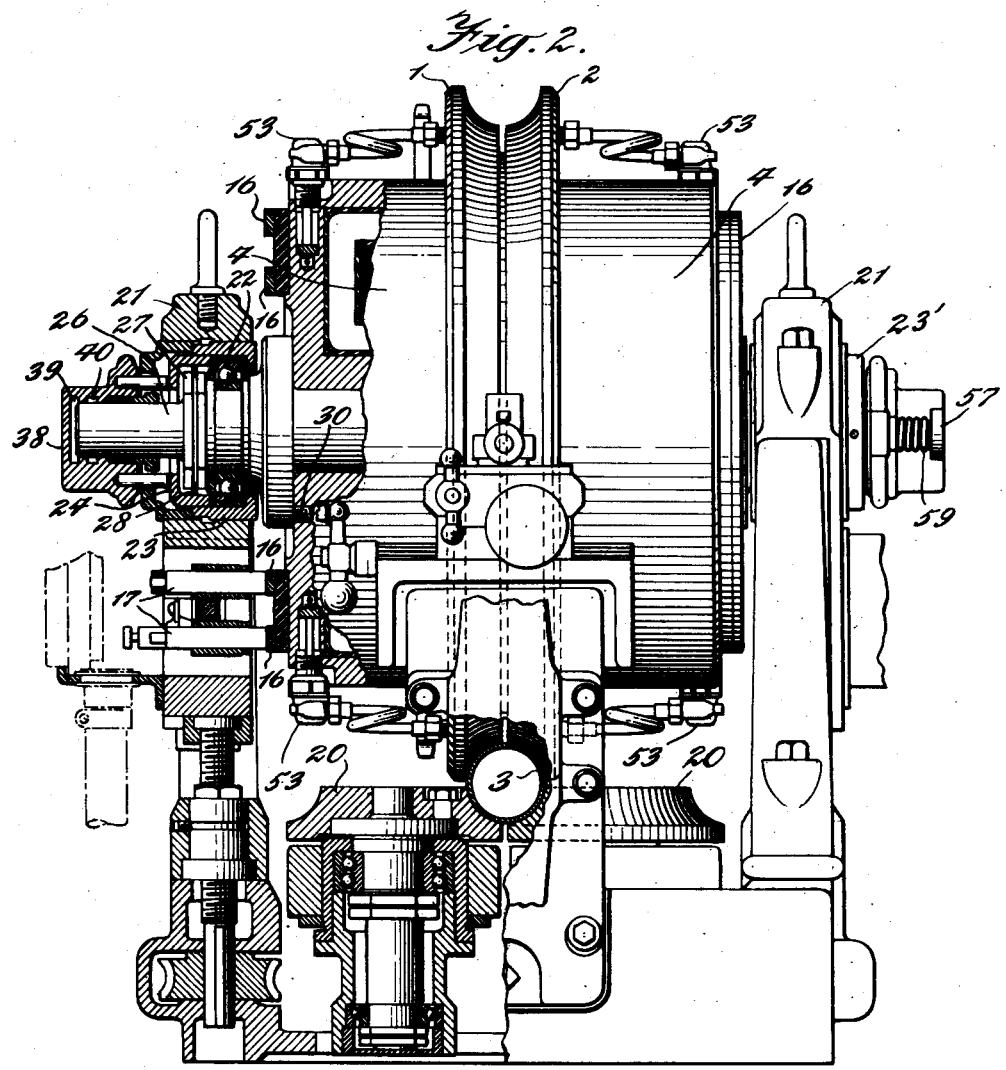
Fig. 2 is a view, partly in section and partly in elevation, of the same transformer as appearing in Fig. 1, this view being taken at right angles to Fig. 1.
Figure 10:
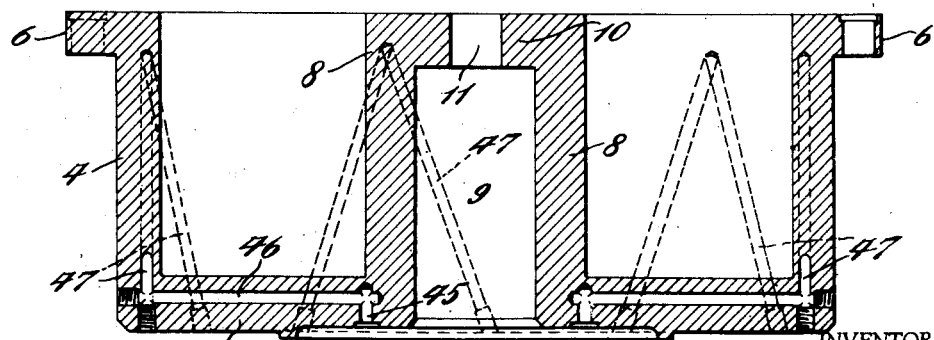
Fig. 10 is a section approximately on the line 10—10 of Fig. 3.
Figures 6, 7:
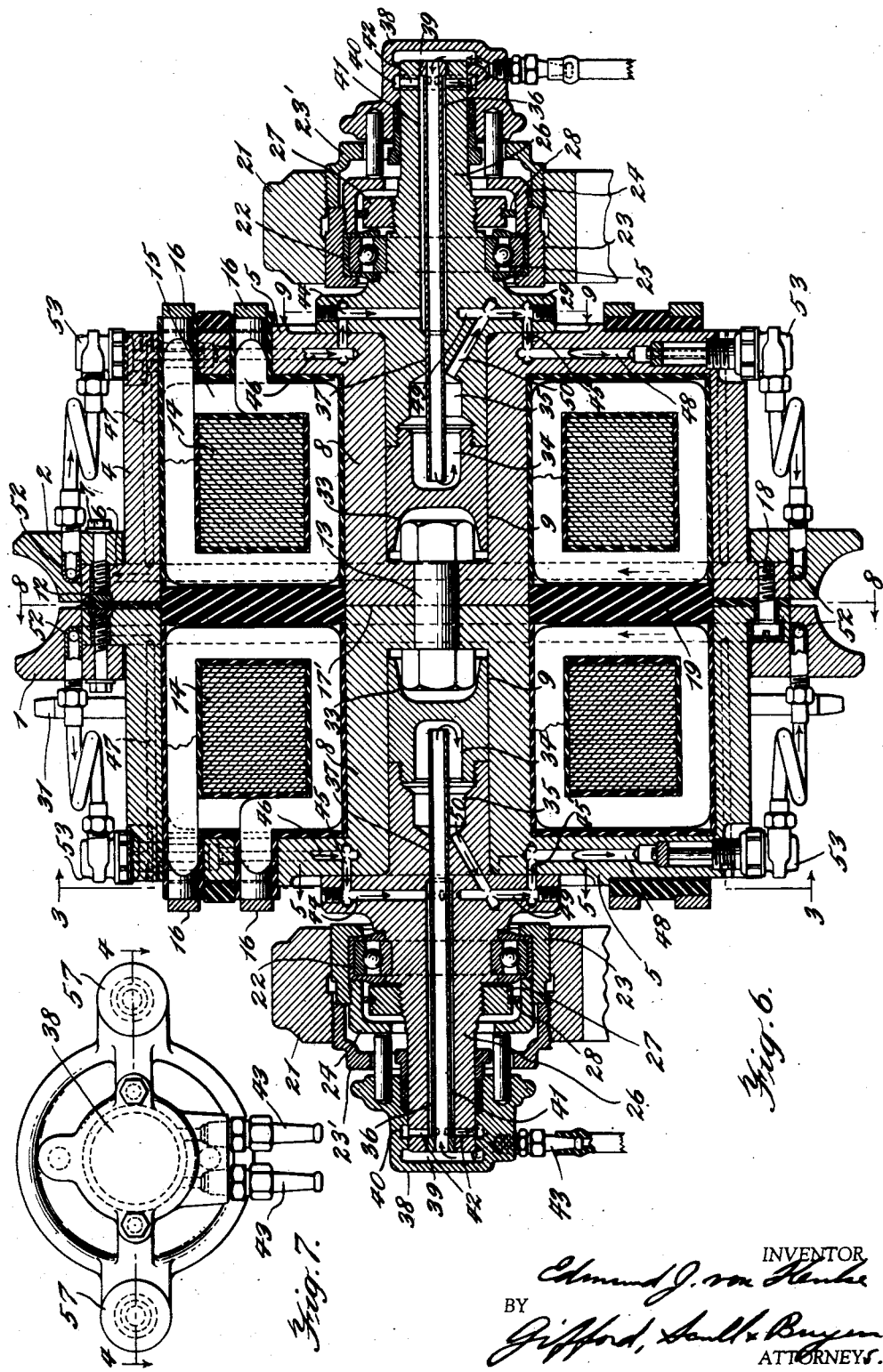
Fig. 6 is a view taken approximately on the line 6—6 of Fig. 3.
Fig. 7 is an end view of the head shown at the left of Fig. 6 and also appearing in certain other figures of the drawings.

The transformer comprises a pair of welding electrode rings 1 and 2 which are spaced apart, as plainly shown, particularly in Figs. 2 and 6, these rings having a contour adapted to fit work which is to be welded and which is exemplified in the present instance by tubing 3. Each ring is preferably made of copper or some other material which is highly conductive so as to provide ready passage for the electric welding current.

The transformer comprises two shells which are duplicates of each other, and a description of one of which will accordingly suffice. Each shell has an outer wall 4 which is cylindrical in form and which is integral with a base 5. At one edge of the wall 4 is an annular flange 6 adapted to receive one of the welding electrodes, these electrodes being secured to the flanges by suitable bolts or screws 7.

Each shell is generally hollow within the space defined by the wall 4 and base 5, it being noted that these two parts are at right angles to each other in the illustrated embodiment. Centrally of the space within the wall 4 is a hollow post 8 having a recess 9 therein, for a purpose which will presently appear. Each post has an end 10 forming the bottom of the recess 9, and this end has a hole 11 therethrough. The shells are so arranged that the end 10 and the flanges 6 are approximately in the same plane, and then when two shells are placed with the ends of two posts in contact with each other, the two flanges 6 on the shells are also substantially in contact with each other, although a slight space therebetween is left for insertion of suitable insulation 12, which may be in the form of an annular ring. The ends of the two posts may be secured together by means of a bolt 13 (Fig. 6).

The space between the wall and the post of each shell is occupied by an annular primary, which may be of any suitable kind, for example the kind shown in my aforesaid patent, and which may comprise a core 14 and a winding 15, the ends of which are led through suitable holes in the base 5 and are secured to contact rings 16, which in turn contact with brushes 17, thus supplying current to the primary.

The secondary of the transformer is thus composed of the two shells which will cause a current to flow from one electrode through the wall 4, base 5, and post 8 of one shell to the post 8 of the other shell and thus through the base 5 and wall 4 of that shell to the other electrode ring. It will be seen that the current is caused to pass across only one joint, namely, the joint 17' between the ends of the two posts 8. The resistance to the flow of current in the secondary is thus reduced to a minimum, since these two posts can be tightly clamped together and can be provided with smooth surfaces forming a good contact. The flanges 6 may also be bolted together through the insulation, one such bolt being shown at 18.

In order to perform the double function of insulating the two primaries from each other and also provide an added structural strength to the transformer, I apply a ring 19 of rigid insulating material which at one edge bridges the joint 17' and at the other end bridges the joint between the two flanges 6. By using the insulating material for this ring, it also performs the added function of preventing passage of current across the secondary between the posts 8 and the flanges 6. The ring 19 may be made of any suitable material, such as that sold under the trade name of Bakelite, which material I have found to be possessed of sufficient structural strength for the purpose of holding the walls and the posts in spaced relation.

A transformer constructed in the manner described above may be rotatably supported so that it will rotate with the work being fed past it, in a manner well known in the art. For example, where the work is tubing, it may be supported on rolls 20 which cooperate with the electrode ring to form a throat through which the work passes. In order to rotatably support the transformer, I provide a pedestal 21 on either side thereof, in each of which is disposed a shaft secured to the transformer and rotatable in the pedestal in a suitable bearing. In the present instance that bearing may comprise a ball race 22 held between two threaded sleeves 23 and 24 and cooperating with a race 25 on a shaft 26, which will be more fully referred to presently. The sleeves 23 and 24 may be adjusted longitudinally of the shaft by means of a washer 23' threaded into the pedestal and contacting with the edge of the sleeve 23. The two washers 23' may work against each other so that a mutual adjustment thereof may accurately center the transformer with respect to the work. Threaded upon each shaft is a ring 27 which is grooved to receive a washer 28.

Each shaft 26 is received within one of the recesses 9 in a shell and has an outwardly extending flange 29 engaging the base of that shell, to which it may be secured by suitable screws 30, so that the shaft and transformer will rotate together.

Ordinarily, a welding transformer is permitted to rotate by movement of the work through the welding throat, but in order to insure that the transformer will rotate at the proper speed, I provide it with a positive driving means exemplified by a toothed sprocket ring 31 which may be secured to one of the electrode rings as by bolts 32. In the illustrated embodiment, this ring 31 is shown as being in segments to provide a more handy arrangement for certain parts of the cooling system.

Within each recess 9 is an insert 33 having therein a recess 34 which cooperates with a recess 35 in the end of the shaft 26 to form a chamber, it being noted that the shaft 26 and insert 33 are threaded together. The shaft also is provided with a central bore through which passes a tube 36, of sufficiently smaller diameter than the bore so as to provide a space between the outer wall of the tube and the wall of the bore. The inner end of this tube is spaced from the wall of the chamber formed by the recesses 34 and 35, as plainly shown in Fig. 6, and this chamber is separated from the bore in the shaft by means of a restriction 37 in which the tube 36 fits snugly, thus preventing passage of fluid between the chamber and the outer part of the bore.

At the end of each shaft is provided a head 38 having two chambers 39 and 40 communicating, respectively, with the interior of the tube 36 and with the bore 41 in the shaft within which the tube 36 is placed. Communication between the chamber 40 and the bore 41 may be had through a plurality of radially extending holes 42, and each chamber 39 and 40 is provided with a connection 43 by means of which fluid may flow into or out of the particular chamber.

Connected with each bore 41 is a plurality of radially extending ducts 44, these ducts being disposed in the flange 29 of the shaft. These bores may be conveniently formed by drilling radially in from the edge of the flange and then by plugging the ends of the bores, as indicated. In the flange and in the adjoining base are matching bores forming together short ducts 45 leading generally parallel to the axis of the shafts and joining the ducts 44 with other radially extending ducts 46 in the base.

Adjacent the ends of the ducts 46, they are intersected by other ducts 47 extending lengthwise of the wall 4 of the shell and substantially the length of the wall. Adjacent the flange 6 each duct 47 is intersected with another duct 47 which extends back towards the base 5 where it is intersected by another duct 48 in the base. Each duct 48 communicates with another duct 45' in the same manner as the ducts 46 communicate with the ducts 45, but the ducts 45' communicate with ducts 49 in the flange of the shaft, which do not extend all the way into the bore 41. Instead, they communicate with the recess 35 through diagonal ducts 50.

Figure 3:
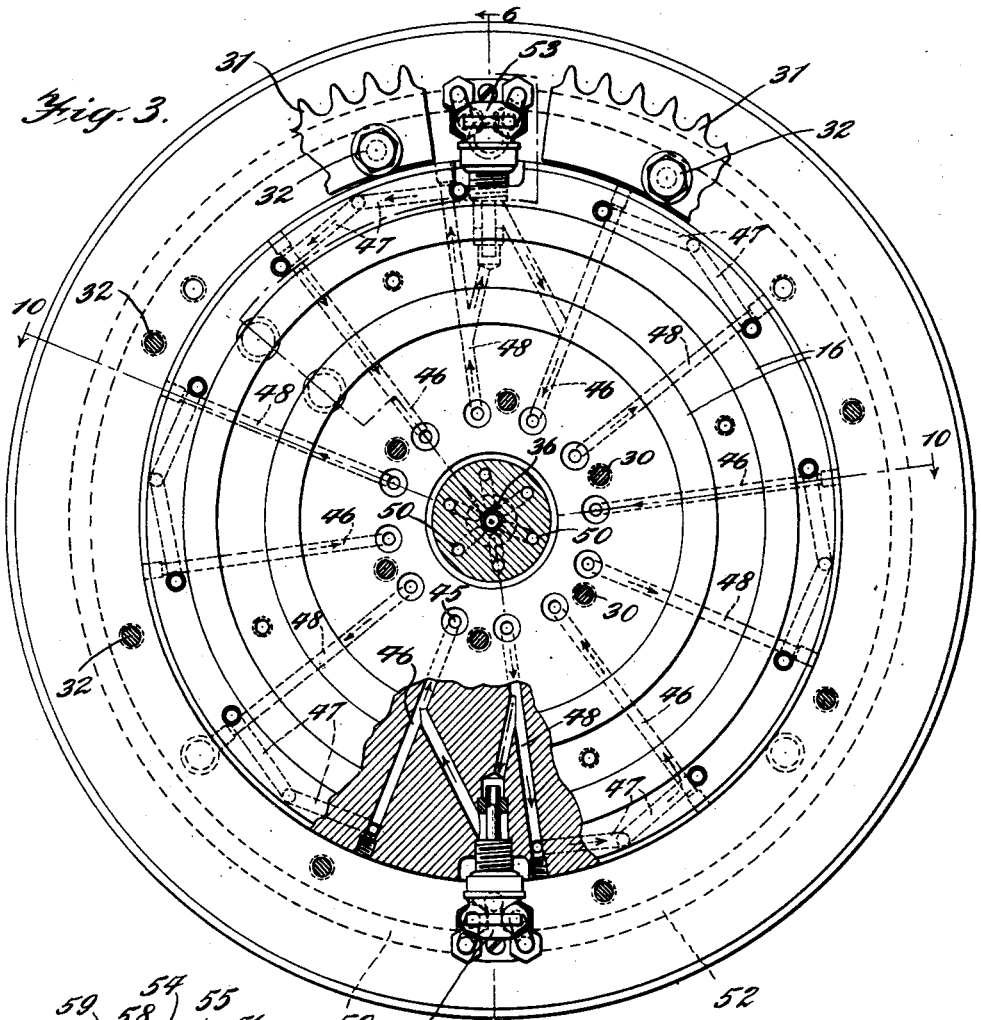
Fig. 3 is a view taken approximately on the line 3—3 of Fig. 6.
Figure 4:
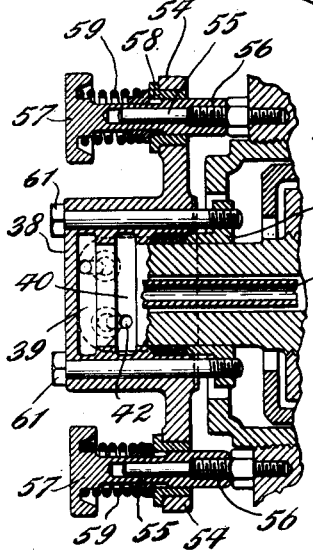
Fig. 4 is a view taken approximately on the line 4—4 of Fig. 7.
Figure 5:
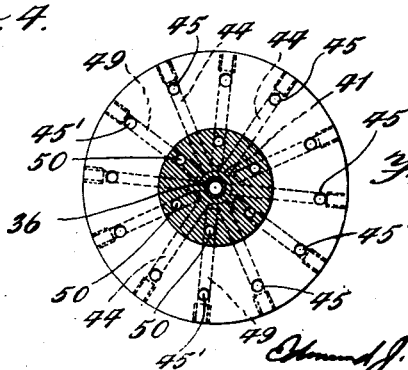
Fig. 5 is a view taken approximately on the line 5—5 of Fig. 6.

By the above arrangement water, oil, or other cooling fluid may flow, for example, into the chamber 39 in the head and thus through the tube 36 into the chamber 34—35 and thence through the ducts 50, 49, 45', 48, 47, 46, 45, and 44, back to the bore 41 and thence into the chamber 40 and out of the head. The ducts are arranged in pairs, as best shown in Fig. 3, so that fluid will flow outwardly, for example, in the duct 48 and back in the duct 46.

Each welding electrode ring is provided with a recess 51 within which is placed a tube 52 which extends through substantially 180° and is connected to a pair of ducts 46 and 48 by means of a suitable head 53, so that water may circulate through a length of tube and thus cool the electrode ring.

The head 38 may be secured in place as a unit by being provided with opposite flanges 54 having holes through which pass centering pins 55. These pins are provided with unthreaded portions adjacent their ends and also with threaded portions 56 adapted to engage screws 57 slidably mounted in fixed bearings 58 in the flanges and acting against springs 59. The head may be sealed to the shaft by means of a gland 60 secured to the head by bolts 61.

While I have shown the invention as embodied in a specific form, it is to be understood that various changes in details may be made without departing from the scope of the invention, as defined by the appended claims.

I claim:

1. A welding transformer comprising two annular primaries disposed coaxially of each other, a secondary comprising two shells, each shell having a wall surrounding one of said primaries and a post extending within a primary, said walls having edges adjacent each other and said posts having ends in contact with each other, means securing together the adjacent ends of said posts and the adjacent edges of said walls, insulation between said edges, and spaced electrodes secured one to each wall.

2. A welding transformer comprising two annular primaries disposed coaxially of each other, a secondary comprising two shells, each shell having a wall surrounding one of said primaries and a post extending within a primary, said walls having edges adjacent each other and said posts having ends in contact with each other, means securing together the adjacent ends of said posts and the adjacent edges of said walls, insulation between said edges, spaced electrodes secured one to each wall, and a ring of rigid insulating material disposed between said posts and said walls adjacent said contacting ends of the posts.

3. A welding transformer comprising two annular primaries disposed coaxially of each other, a secondary comprising two shells, each shell having a wall surrounding one of said primaries and a post extending within a primary, said walls having edges adjacent each other and said posts having ends in contact with each other, means securing together the adjacent ends of said posts and the adjacent edges of said walls, insulation between said edges, spaced electrodes secured one to each wall, and means disposed between said posts and said walls adjacent said contacting ends of the posts for rigidly and insulatively holding said walls and said posts in spaced relation.

4. A welding transformer comprising two annular primaries disposed coaxially of each other, a secondary comprising two shells, each shell having a wall surrounding one of said primaries and a post extending within a primary, said walls having edges adjacent each other and said posts being hollow but having closed ends in contact with each other, and a bolt passing through said ends and securing them together.

5. A welding transformer comprising two annular primaries disposed coaxially of each other, a secondary comprising two shells, each shell having a wall surrounding one of said primaries and a post extending within a primary, said walls having edges adjacent each other and said posts being hollow but having closed ends in contact with each other, means fastening said ends together, spaced electrodes secured one to each wall, a shaft disposed within each post and extending outwardly therefrom, means securing said shafts to said shells, and bearings rotatably supporting said shafts.

6. A welding transformer comprising two annular primaries disposed coaxially of each other, a secondary comprising two shells, each shell having a wall surrounding one of said primaries and a post extending within a primary, said walls having edges adjacent each other and said posts being hollow but having closed ends in contact with each other, means fastening said ends together, spaced electrodes secured one to each wall, a shaft disposed within each post and extending outwardly therefrom, means securing said shafts to said shells, bearings rotatably supporting said shafts, means forming chambers within said posts, means to discharge a cooling fluid into said chambers, a plurality of ducts in said shells communicating with said chamber, and means to discharge fluid flowing through said ducts from said chamber.

EDMUND J. von HENKE.